(12) United States Patent
Tighe

(10) Patent No.: US 7,974,496 B2
(45) Date of Patent: Jul. 5, 2011

(54) DIGITAL IMAGE DROP ZONES AND TRANSFORMATION INTERACTION

(75) Inventor: Joseph Tighe, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 12/800,762

(22) Filed: May 20, 2010

(65) Prior Publication Data

US 2010/0271403 A1    Oct. 28, 2010

Related U.S. Application Data

(63) Continuation of application No. 11/522,779, filed on Sep. 18, 2006, now Pat. No. 7,751,652.

(51) Int. Cl.
*G06K 9/32* (2006.01)
*G06G 5/00* (2006.01)

(52) U.S. Cl. .................................. 382/298; 345/660

(58) Field of Classification Search .......... 382/276–308; 345/626, 660–662; 715/788
See application file for complete search history.

(56) References Cited

U.S. PATENT DOCUMENTS

| 5,469,536 A * | 11/1995 | Blank .......................... 345/594 |
| 6,449,398 B1 * | 9/2002 | Gennetten ..................... 382/298 |
| 2001/0001857 A1 * | 5/2001 | Kendall et al. ................. 707/501 |

* cited by examiner

*Primary Examiner* — Vu Le
*Assistant Examiner* — Alex Liew
(74) *Attorney, Agent, or Firm* — Van Pelt, Yi & James LLP

(57) ABSTRACT

A portion of a digital image is displayed where the portion that is displayed depends upon a mask. After the portion of the digital image is displayed, a change to the mask is received. It is determined, based at least in part on the received change to the mask, a transformation to be applied to the digital image. A new portion of the digital image is displayed based at least in part on the changed mask and the determined transformation, where the new portion that is displayed has the same center point as the previously displayed portion.

22 Claims, 13 Drawing Sheets

$$\begin{bmatrix} a & b & t_x \\ c & d & t_y \\ 0 & 0 & 1 \end{bmatrix} \begin{bmatrix} x_{strat,i} \\ y_{strat,i} \\ 1 \end{bmatrix} = \begin{bmatrix} x_{temp,i} \\ y_{temp,i} \\ 1 \end{bmatrix}, \text{ where } i = 0,1,2,3$$

Transformation Matrix
$$\begin{bmatrix} a & b & t_x \\ c & d & t_y \\ 0 & 0 & 1 \end{bmatrix} = \begin{bmatrix} 1.25 & 0 & -0.25 \\ 0 & 1.25 & -0.3125 \\ 0 & 0 & 1 \end{bmatrix}$$

Mask Corner Points with User
Changes Applied
and
Photograph Corner Points with
Transformation Applied

US 7,974,496 B2

DIGITAL IMAGE DROP ZONES AND TRANSFORMATION INTERACTION

CROSS REFERENCE TO OTHER APPLICATIONS

This application is a continuation of U.S. patent application Ser. No. 11/522,779, entitled DIGITAL IMAGE DROP ZONES AND TRANSFORMATION INTERACTION filed Sep. 18, 2006 now U.S. Pat. No. 7,751,652 which is incorporated herein by reference for all purposes.

BACKGROUND OF THE INVENTION

Scrapbooks and other documents are created by combining a variety of objects such as images (e.g., photographs), text (e.g., captions, comments, etc.), souvenirs (e.g., postcards, ticket stubs, concert programs, etc.), and/or decorations (e.g., stickers, embossments, seals, etc.). Objects are laid out and arranged in desired positions on a page. Oftentimes, users want to make many "tweaks" (e.g., to the layout, cropping, etc.) in order to achieve an attractive scrapbook. Scrapbooks or portions of scrapbooks may be created using software. In some software applications, a user is required to manually repeat or readjust certain steps, for example after making a change to a portion of a photograph that is displayed. More convenient techniques for creating scrapbooks and other documents would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A portion of a digital image is displayed. A change associated with a mask is received, where the mask is associated with a displayed portion of the digital image. A transformation to be applied is determined based at least in part on the received change. A new portion of the digital image is displayed based at least in part on the received change and the transformation; the new portion that is displayed has the same center point as the previously displayed portion if appropriate. In some embodiments, the digital image includes a digital photograph. In some embodiments, a transformation includes translation and/or resizing. In some embodiments, the transformation is applied to the image (e.g., a user's changes are applied to a mask and a transformation is applied to an image).

Figure 1:
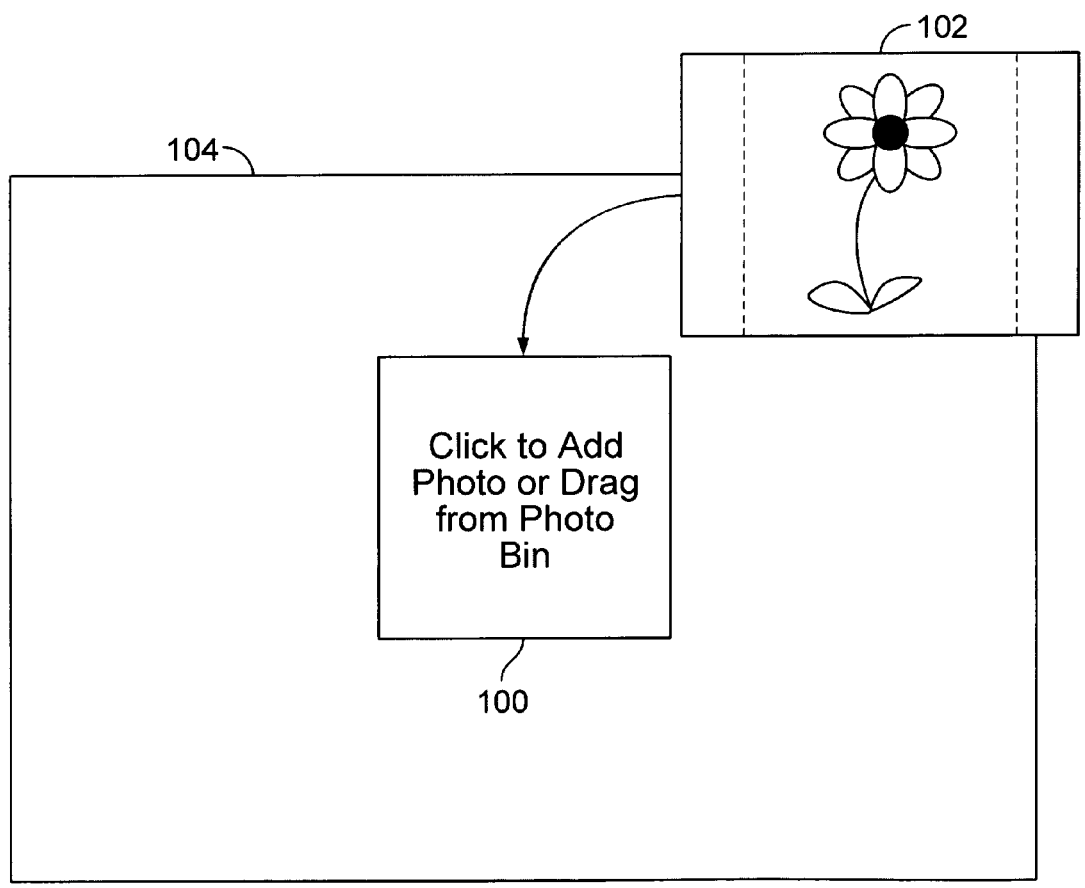
FIG. 1 is a diagram illustrating an embodiment of an empty drop zone to which a digital photograph is added.

FIG. 1 is a diagram illustrating an embodiment of an empty drop zone to which a digital photograph is added. In the example shown, digital photograph 102 is inserted or added to empty drop zone 100. A drop zone that does not include or is not associated with a digital photograph is referred to as an empty drop zone. In some embodiments, empty drop zones include instructions for adding a digital photograph; empty drop zone 100 in this example says, "Click to add photo or drag from photo bin."

In some embodiments, a drop zone is associated with a mask and a digital photograph. A mask is associated with a portion of a photograph that is displayed and may have any shape. In some embodiments, the portion of a photograph that is displayed is dependent upon both a mask and a photograph.

For example, in some embodiments, both a photograph and a mask are permitted to move within some 2D space and the displayed portion of a photograph is the part that is bounded by or that overlaps with the mask. In some embodiments, a portion of a photograph that is displayed depends only upon a mask. For example, conceptually, a photograph is fixed in place and a mask moves over it, indicating or defining which portion of the "stationary" photograph is displayed.

Drop zone 100 is included in and has some placement within document 104. For example, a user is able to move drop zone 100 around within document 104 either in an empty state (e.g., prior to inserting photograph 102) or after a photograph has been added to a drop zone. In various embodiments, document 104 is a page, web site, template, word processing document, slideshow/presentation document, etc. In some embodiments, drop zones are used in applications associated with storing, organizing, editing, tagging, and/or searching digital images and/or videos, such as Adobe® Photoshop® Elements or Adobe® Photoshop®. In some embodiments, document 104 is associated with scrapbooks.

In this example, the aspect ratio of digital photograph 102 does not match that of drop zone 100 and the left and right edges of digital photograph 102 are not displayed after insertion. For example, empty drop zone 100 may initially have the same aspect ratio as photograph 102, but the user may have resized it prior to adding photograph 102. The mask associated with empty drop zone 100 in some embodiments has the same shape as drop zone 100 so that only a portion of photograph 102 is displayed after insert. In some cases, the mask lines up with the center portion of photograph 102 (indicated by the dashed lines), indicating what part of the photograph is displayed. In some embodiments, the portions of photograph 102 that are not displayed (e.g., left and right edges of digital photograph 102) are not discarded. For example, these portions can potentially be displayed later on.

In some embodiments, a drop zone is associated with at most one digital photograph. For example, some applications or interfaces are configured to replace a digital photograph with another digital photograph if a photograph is added to a drop zone that is not empty.

Although some examples described herein discuss the use rectangles, in some embodiments some other shape is used (e.g., ovals, triangles, pentagons, etc.). Similarly, although some of the examples described herein show a single drop zone in a document, in some embodiments a document includes multiple drop zones. In some embodiments, a mask has a different shape than a drop zone (e.g., a mask is an oval that fits within a rectangular drop zone and only an oval portion of a photograph is displayed).

When a user performs a transformation on or change to a drop zone, a corresponding transformation is determined. In some embodiments, such a transformation is based on the user's change and is applied in addition to or in combination with the user's change. In some embodiments, this transformation is performed on a photograph associated with that drop zone so that, for example, the center point of a displayed part of photograph is, if possible, kept the same. For example, a user making a scrapbook may only want to have two people in a group photo in her scrapbook. The user may have set or adjusted a mask and/or photograph associated with a drop zone so that only the desired people are displayed. To fit other items on the page, the user may resize the drop zone. For example, the user may grab a corner of a drop zone and resize the photograph to fit more photographs in a page or document. In some embodiments, a transformation is determined and applied to the photograph so that the portions of the photograph displayed before and after a resize have the same center point displayed (e.g., some point between the two desired people in the group photo). In some embodiments, a transformation attempts to maintain a rotation. For example, a user may have laid out photographs along a diagonal line, and a transformation may attempt to keep this rotation the same after some change. In some embodiments, a transformation attempts to keep a degree of zoom or a cropping the same, for example by resizing a photograph without distorting an image. To achieve these or other effects, in various embodiments, a transformation includes rotation, resizing (e.g., resizing a photograph), warping, translating (e.g., moving or repositioning a photograph), etc.

In some embodiments, a drop zone is used with some other digital image besides a digital photograph. For example, drops zones in some embodiments are used with digitally created art, for example generated using Adobe® Illustrator®. In various embodiments, a drop zone is associated with a digital object, digital artwork, etc.

Figure 2:
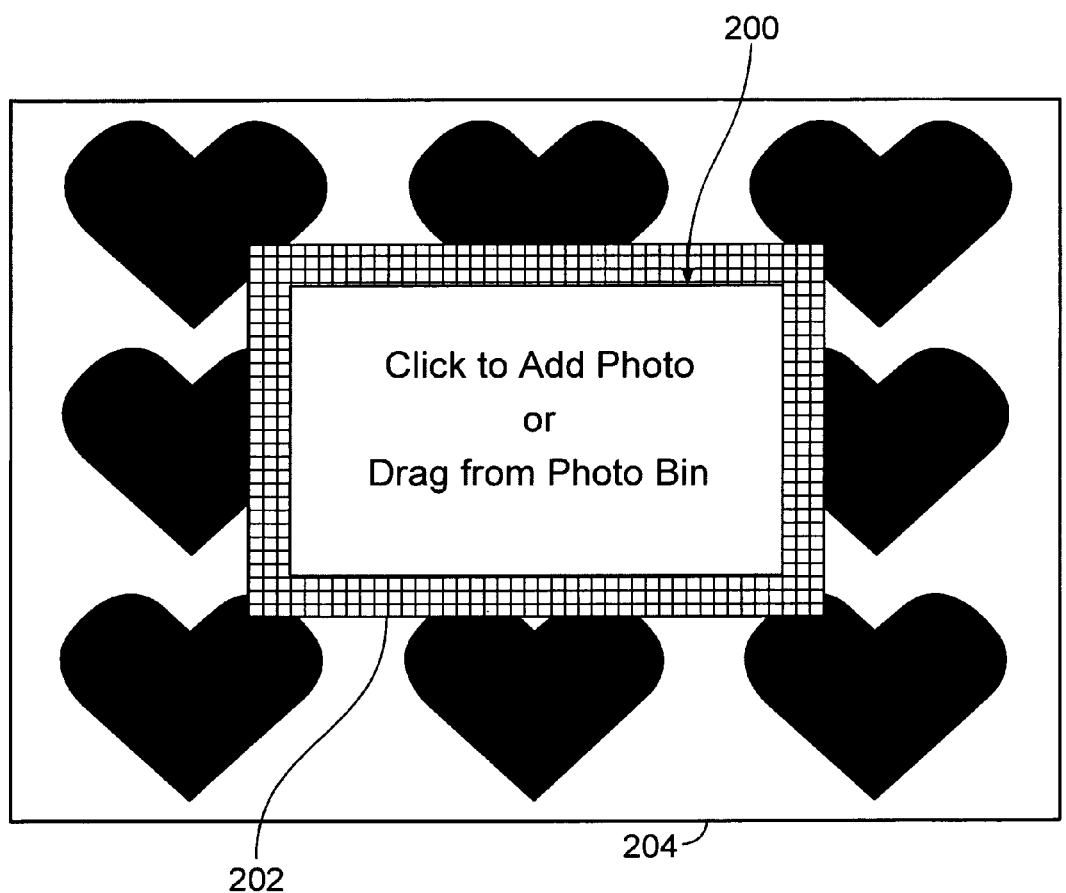
FIG. 2 is a diagram illustrating an embodiment of an empty drop zone with a border and a background.

FIG. 2 is a diagram illustrating an embodiment of an empty drop zone with a border and a background. In the example shown, document 204 has a background of hearts. In some applications or interfaces, a user is able to select from a variety of backgrounds and a selected background is applied to a document. Border 202 surrounds drop zone 200 and in some embodiments is automatically adjusted based on changes to drop zone 200. For example, if a user resizes and/or translates drop zone 200, border 202 is correspondingly resized and/or moved. In some embodiments, some other shape or pattern is used as a border around a drop zone. Similar to backgrounds, in some embodiments a user is able to pick a border and apply the border to a selected drop zone (e.g., using operations or functionality provided by an application or interface). In some cases, two drop zones have different borders applied even though they are included in the same document or page. In some cases, one drop zone has a border or frame and another does not.

In some embodiments, a document, template or page that includes a drop zone includes a border and/or a background. For clarity, some of the examples described herein do not include borders and/or backgrounds, but the techniques disclosed herein are used in some embodiments with borders and/or backgrounds.

Figure 3A:
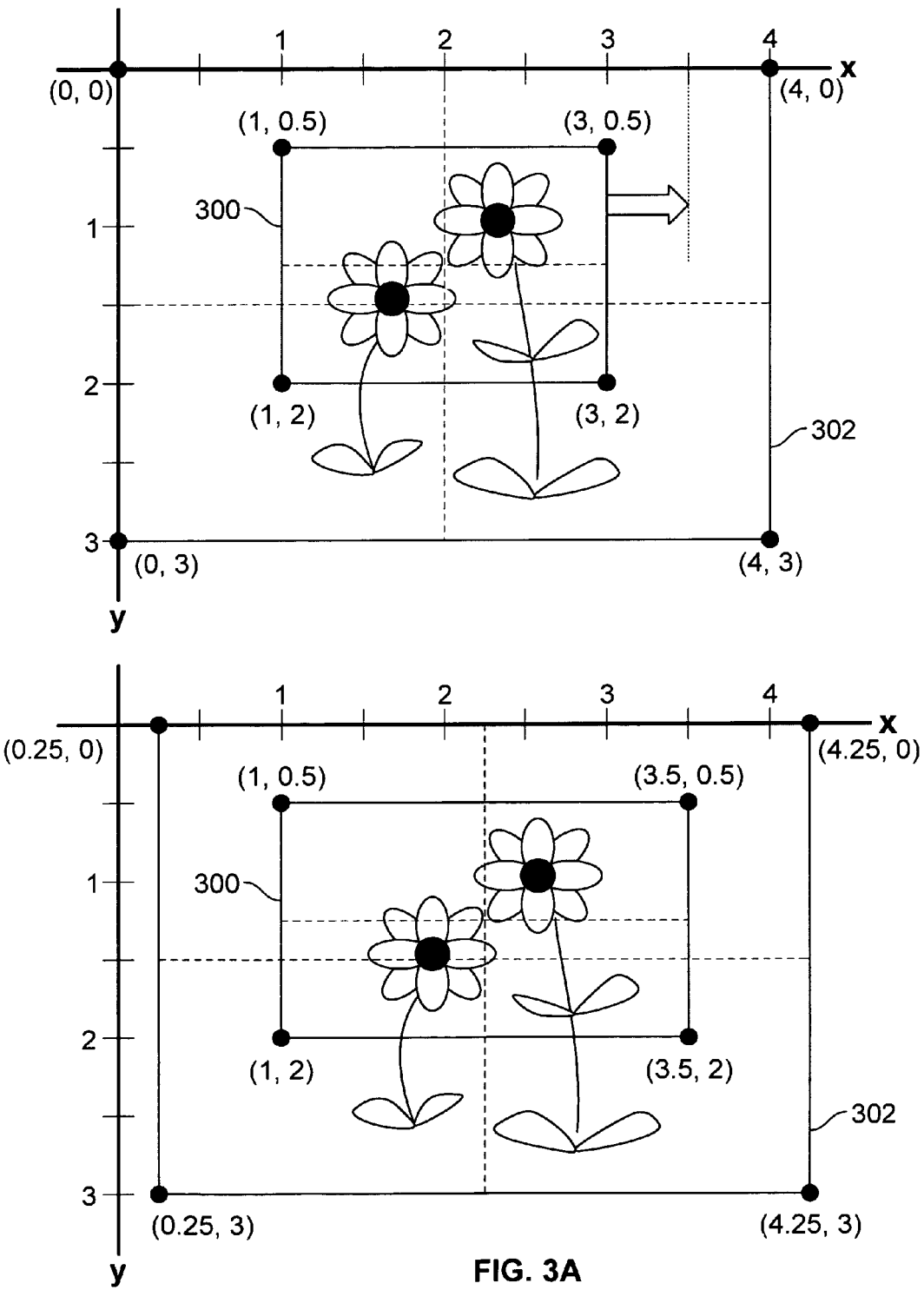
FIG. 3A is a diagram illustrating an embodiment of a photograph that is translated based on an adjustment made by a user.

FIG. 3A is a diagram illustrating an embodiment of a photograph that is translated based on an adjustment made by a user. In the example shown, a mask and a photograph associated with a drop zone are shown. To more clearly illustrate some techniques, an associated document that includes the drop zone and the drop zone's position/location in the document are not shown in this figure. In the example shown, a displayed portion of a photograph is described and the displayed portion is appropriately positioned or located within an associated document or page.

The top diagram illustrates mask 300 and photograph 302 before a user makes an adjustment. Photograph 302 has corners located at (0,0), (4,0), (0,3), and (4,3). Mask 300 has corners located at (1,0.5), (3,0.5), (1,2), and (3,2). The portion of the photograph that is displayed is within mask 300 (i.e., the heads of the flowers). For example, a user has cropped, positioned or otherwise set mask 300 and/or photograph 302 so that the heads of the flowers are centered in the displayed portion. A user decides to grab the right edge of the example drop zone (e.g., having the same border as mask 300) and pulls the right edge out by half a unit. In various embodiments, a variety of units can be used, such as pixels, inches, points, etc. In this embodiment, a user's change is restricted or otherwise applied to mask 300, and a transformation that is determined based on that adjustment or change is applied only to photograph 302.

The bottom diagram illustrates mask 300 after the user's change has been applied to mask 300 and after a transformation has been applied to photograph 302. Note that the left edge of mask 300 is the same (i.e., there are still two corners at (1,0.5) and (1,2)) but the right edge of mask 300 is at x=3.5 (i.e., the other two corners are at (3.5,0.5) and (3.5, 2)).

A transformation (not shown) is determined based on this change and is applied to photograph 302. In this example, photograph 300 remains the same size and is translated 0.25 units in the positive x direction. By translating or otherwise repositioning photograph 302 to the right, the portion of photograph 302 that is displayed has the same center point. For example, in the top diagram the center point of mask 300 is located half a unit above the center point of photograph 302 and in the bottom diagram this relationship still holds.

In this embodiment, a transformation is restricted to translation (i.e., moving within 2D space) and resizing is not permitted. In some embodiments, a transformation includes resizing (e.g., so that the displayed portion appears to zoom in/out) and some examples are described in further detail below.

In some embodiments, some other change causes a transformation to be determined and applied. For example, in some embodiments, resizing a drop zone (e.g., by grabbing a corner and dragging the corner inwards/outwards) causes a transformation to be determined and applied. In some embodiments, warping and/or rotation causes a transformation to be determined and applied. In some embodiments, certain changes do not cause a transformation to be determined/applied. For example, in some embodiments, translating or moving a drop zone does not cause a transformation to be determined and applied.

In some embodiments, there is a mode in which a user is able to operate on or change a photograph and/or mask without causing a transformation to be automatically determined and applied. For example, suppose that the user wants to make an adjustment after the example of the bottom diagram in FIG. 3A. In some embodiments a user is able to select photograph 302 or mask 300 (e.g., without causing an automatic transformation process to be performed) and change what portion of a photograph is displayed by, for example, translating and/or resizing a photograph or mask. A user may, for example, zoom in/out and/or change a cropping without causing a transformation to be determined and applied automatically. Should a user subsequently operate on a drop zone, in some embodiments an automatic transformation process attempts to, for example, maintain this new center point. In some embodiments, different selection paths and/or visual indicators are used to respectively select and indicate what mode of operation a user is in. For example, some interfaces or applications are configured to show all of a photograph (e.g., including non-displayed parts) when an automatic transformation process will not be performed.

The 2D space shown in this example may not necessarily be related to the position of an associated drop zone within a document. In some embodiments, a first coordinate system is used in determining a portion of a photograph to display (e.g., including determining a transformation to apply to a photograph and applying that transformation to the photograph). In some embodiments, there is a second coordinate system associated with the position of a drop zone within a document and this second coordinate system is used to determine where a displayed portion of a photograph is positioned or placed within that document.

A particular technique can be implemented in a variety of ways, respectively, in various embodiments. The following figure illustrates another embodiment in which the same displayed portion results after a transformation is determined and applied.

Figure 3B:
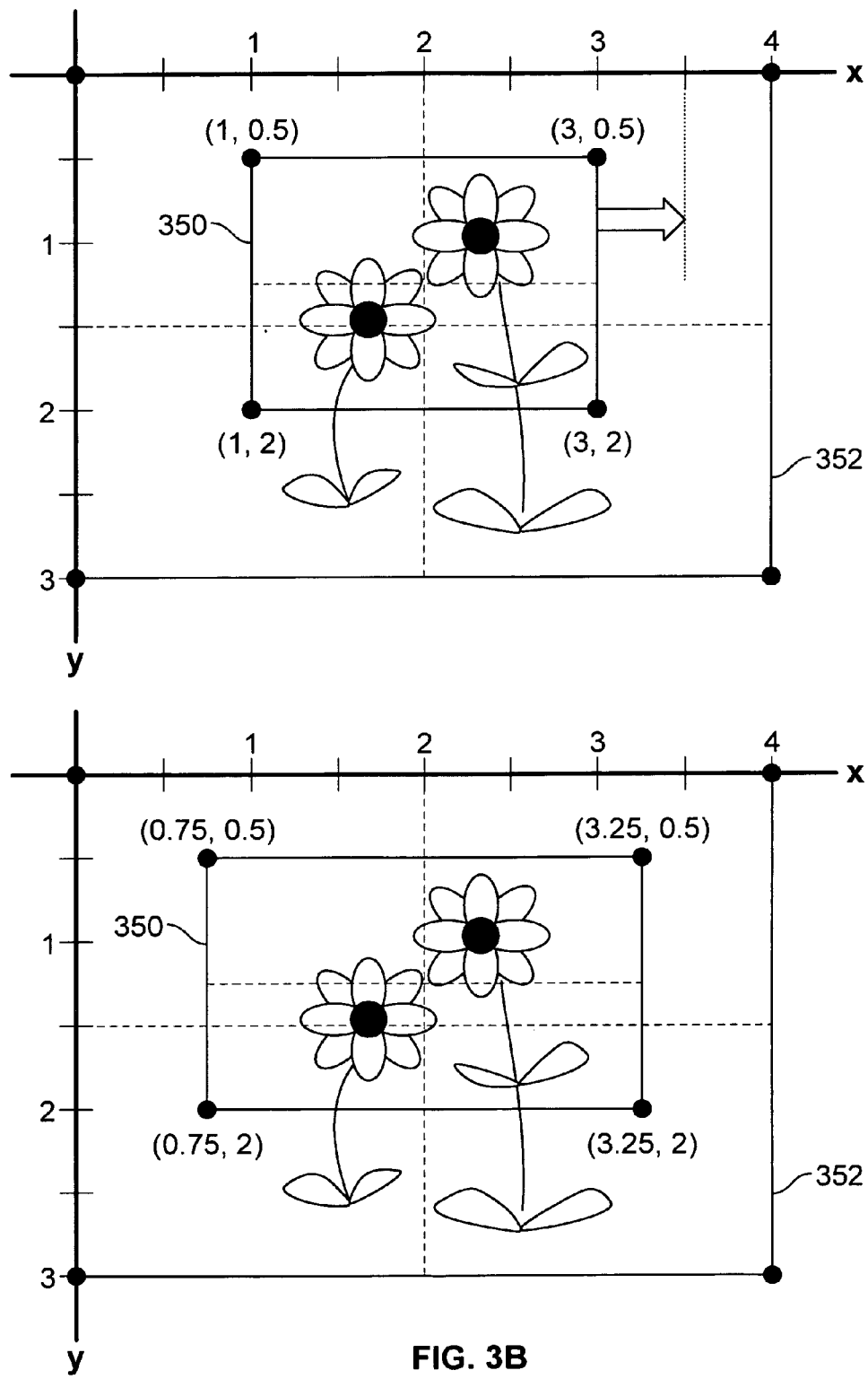
FIG. 3B illustrates an embodiment in which a photograph is conceptually fixed in 2D space and a transformation is applied to a mask.

FIG. 3B illustrates an embodiment in which a photograph is conceptually fixed in 2D space and a transformation is applied to a mask. In the example shown, the user makes the same change shown in FIG. 3A. However, in this example, photograph 352 is fixed within the example coordinate system and the transformation that is determined is applied to the mask.

The top diagram illustrates the mask and photograph before a user's change. Mask 350 and photograph 352 have the same respective corner points as the previous figure located at (1,0.5), (3,0.5), (1,2), and (3,2) and at (0,0), (4,0), (0,3), and (4,3), respectively. A user performs the same change, grabbing the right edge of a drop zone and pulling the right edge out by half a unit.

The bottom diagram illustrates mask 350 and photograph 352 after the user's change and a transformation have been applied to mask 350. In this example, photograph 352 does not move and its corner points remain at (1,0.5), (3,0.5), (1,2), and (3,2). The width of mask 350 has increased from 2 units to 2.5 units (as a result of the user's change) and has been translated 0.25 units to the left (as a result of the transformation based on the change). The corner points of mask 350 are now located at (0.75,0.5), (3.25,0.5), (0.75,2), and (3.25, 2).

In the examples of FIGS. 3A and 3B, the same displayed portions result even though the example processes are different. As shown, the same or similar results may be obtained using a variety of techniques.

Figure 3C:
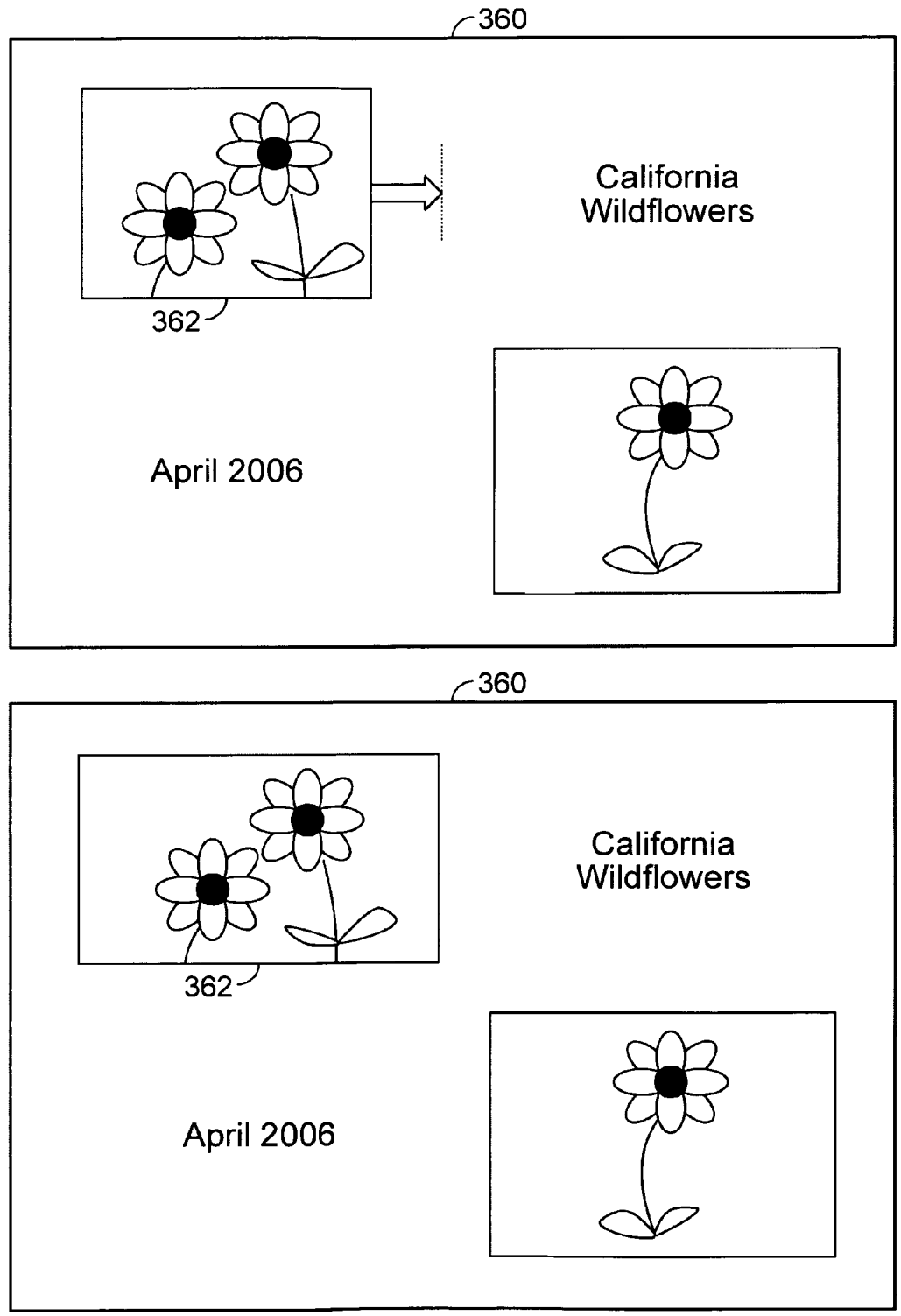
FIG. 3C is a diagram illustrating an embodiment of a document that includes a drop zone in which a user makes a change.

FIG. 3C is a diagram illustrating an embodiment of a document that includes a drop zone in which a user makes a change. In the examples of FIGS. 3A and 3B, the same displayed portion results. In the example shown, a displayed portion of a digital photograph or other image is shown within an associated document or page. In the top diagram, a user grabs the right edge of drop zone 362 within document 360 and drags it out half a unit. A transformation is determined based on the user's change (e.g., according to either FIG. 3A or 3B) and applied. In this example, the transformation based on the user's change includes translation and excludes resizing. That is, in this example, a transformation attempts to keep the center point of the displayed portion the same, but the displayed portion will not appear to zoom in/out. In other embodiments, a transformation includes other processing such as warping, resizing, and/or rotating. The bottom diagram shows document 360 after the user's change and the transformation are applied. Note that the right edge of drop zone 362 in the bottom diagram has been extended out half a unit (e.g., as a result of the user's change) and that the center point of the displayed portion is substantially the same as the top diagram.

Figure 4:
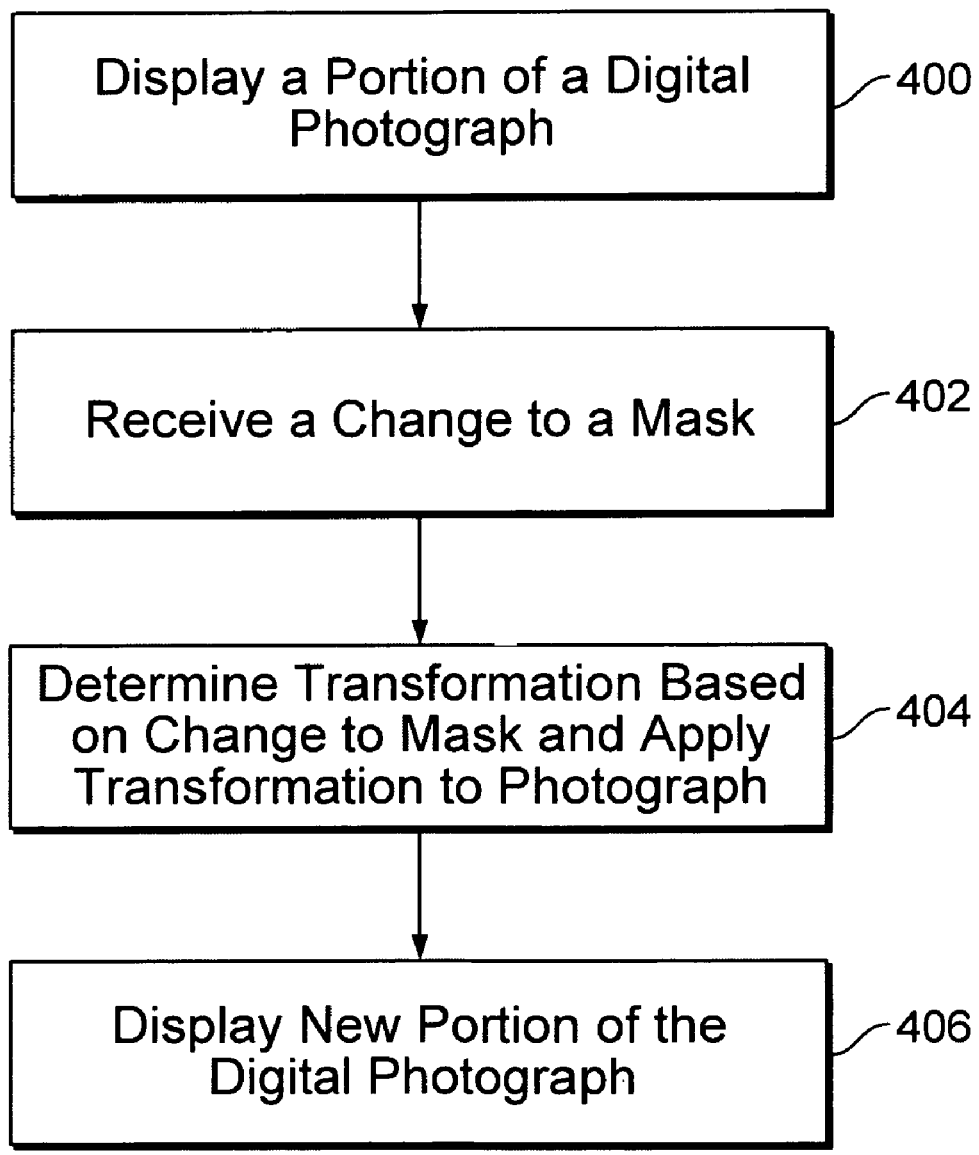
FIG. 4 is a flowchart illustrating an embodiment of a process for transforming a photograph based at least in part on a user's change.

FIG. 4 is a flowchart illustrating an embodiment of a process for transforming a photograph based at least in part on a user's change. In the example shown, a user's change is applied to a mask and a transformation that is determined based on the change is applied to a photograph. In some embodiments, this is performed differently (e.g., as in the example of FIG. 3B where the transformation is applied to a mask and a photograph is stationary or fixed) and the example process is modified accordingly.

At 400, a portion of a digital photograph is displayed. In some embodiments, the portion of a photograph that is displayed depends on the relative positions of a mask and a photograph. For example, the part of photograph that overlaps with or is bounded by a mask in some embodiments is the displayed portion. A displayed portion is positioned or located at an appropriate place within a document, template or page.

A change to a mask is received at 402. In some embodiments, a change is performed by a user and comprises a transformation such as some combination of skewing, distorting, resizing, rotating, and/or translating. Although some of the examples described herein describe certain examples (e.g., grabbing an edge and pulling outward), in various embodiments a user able to perform any transformation using a variety of user interfaces.

At 404, a transformation is determined based on a change to a mask and the transformation is applied to the photograph. In some embodiments, a transformation includes translating and/or repositioning a photograph, for example so that a center point is maintained. In some embodiments, a transformation includes resizing, so that it appears as if a displayed portion is being zoomed in/out. In some embodiments, resizing is performed in a manner that preserves a photograph's aspect ratio so that an image is not distorted, for example by uneven scaling along the x and y dimensions. In some embodiments, a drop zone is rotated and a transformation attempts to preserve rotation.

At 406, a new portion of the digital photograph is displayed. In embodiments, a transformation attempts to (for example) maintain a center point, prevent distortion, and/or maintain a rotation between displaying at 400 and displaying at 406. In some embodiments, some other result is desired in addition to or as an alternative to the examples described above. In some embodiments, desired results or are ranked with respect to each other or are weighted. For example, some desired results may be less important than other desired results and a ranking or relationship may attempt to quantify or otherwise describe this.

In some cases a transformation has some undesirable result. For example, in some cases a blank space is shown where a mask extends beyond the edge of a photograph. It may be undesirable to show blank spaces and in some embodiments error checking and/or correction is performed to detect/correct for this. For example, if it is determined that a blank space is shown, in some embodiments a photograph is translated so that no blank space is shown. Other undesirable effects may be checked for and/or corrected.

In some embodiments, an automatic transformation process is performed in real time, for example regardless of whether or not a user has committed to a particular change. A user in some embodiments does not necessarily need to release a mouse button or otherwise commit to a change in order for a new portion of a photograph to be displayed (e.g., including determining and applying a transform). Referring to the examples of FIGS. 3A and 3B, in some embodiments, a user selects the right edge of a drop zone and holds down a mouse button while dragging the right edge outwards. In some embodiments, even though the user has not necessarily released the mouse button or otherwise committed to a particular change, a display is constantly updated (e.g., using an automatic transformation process) even while the mouse button is held down and the user has not yet committed to a change. In some embodiments, the example process is performed many times a second so that to a user it appears as if a displayed portion has, for example, the same or a constant center point.

Figure 5:
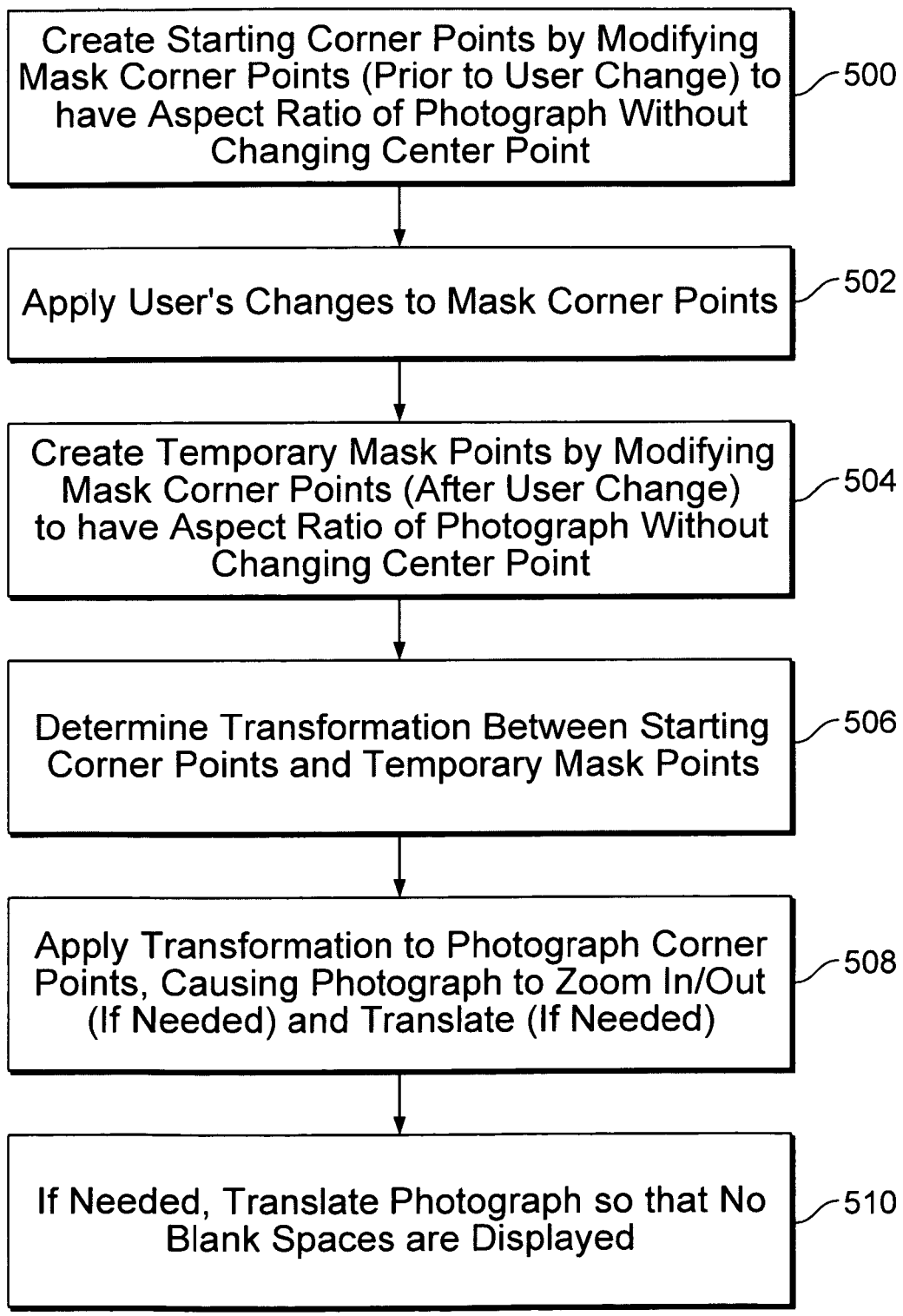
FIG. 5 is a flowchart illustrating an embodiment of a process for determining and applying a transformation.

FIG. 5 is a flowchart illustrating an embodiment of a process for determining and applying a transformation. In the example shown, a transformation attempts to maintain the center point of the displayed portion and a degree of zoom (e.g., compensating for a user's change) and a transformation includes resizing and/or translation. In this example, image distortion is prevented by resizing the photograph in a manner that does not change the aspect ratio of the photograph.

At 500, starting corner points are created by modifying mask corner points (prior to a user change) to have the aspect ratio of a photograph without changing the center point.

A user's changes are applied to mask corner points at 502. The mask corner points that result from step 502 determine or describe the part of a photograph that is displayed. For example, after determining a transformation and applying it to a photograph's corner points, the portion of the transformed photograph that is within a mask (e.g., output at step 502) is displayed.

At 504, temporary mask points are created by modifying mask corner points (after a user change) to have the aspect ratio of a photograph without changing the center point. For example, the corner points obtained at 502 are used in step 504.

A transformation between the starting corner points and the temporary mask points is determined at 506. In some embodiments, a transformation is in matrix form. In some embodiments, when a transformation matrix is applied to one of the starting corner points (e.g., obtained at 500), a corresponding temporary mask points (e.g., obtained at 504) is obtained. For example, applying a transformation to the upper left corner of the starting corner points in some embodiments causes the upper left corner of the temporary mask points to be generated.

At 508, the transformation is applied to the photograph corner points, causing a photograph to zoom in/out (if needed) and translate (if needed). The outputs of step 508 (i.e., photograph with transformation applied) and step 502 (i.e., mask with user's changes applied) may be combined to determine a displayed portion of a photograph. At 510, a photograph is translated, if needed, so that no blank spaces are displayed. For example, in some systems a blank space is displayed for a part of a mask that extends beyond the edge of a photograph and step 510 corrects for this.

Figure 6:
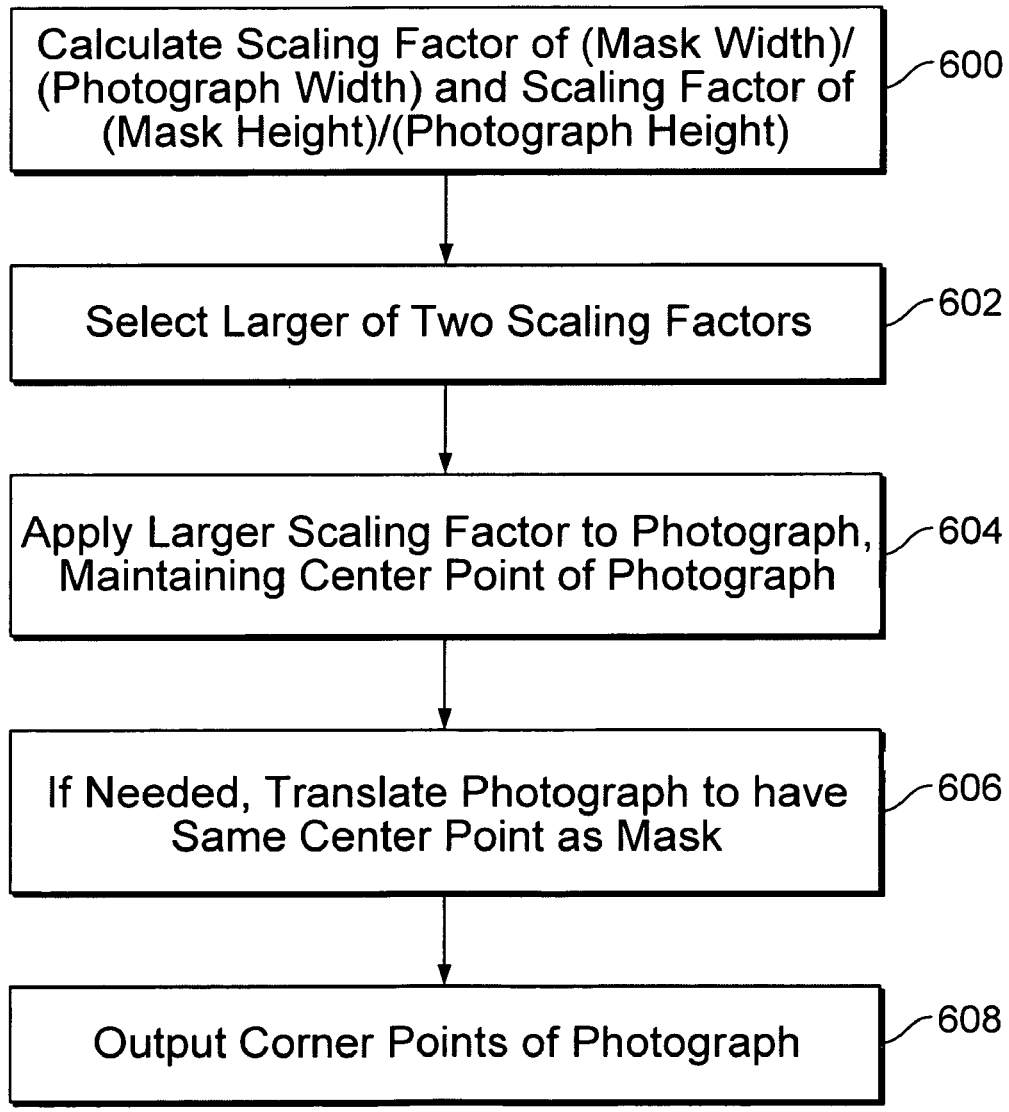
FIG. 6 is a flowchart illustrating an embodiment of a process for modifying a mask to have the same aspect ratio as a photograph.

FIG. 6 is a flowchart illustrating an embodiment of a process for modifying a mask to have the same aspect ratio as a photograph. In some embodiments, the example process is a sub-process used in determining a transformation to apply (e.g., to a photograph) based on a user's change. For example, the example process is used in some cases at 500 to modify mask corner points without a user's change applied and/or at 504 to create temporary mask corner points.

At 600, a scaling factor of (mask width)/(photograph width) and a scaling factor of (mask height)/(photograph height) are calculated. The larger of the two scaling factors is selected at 602. The larger scaling factor is applied to the photograph, maintaining the center point of the photograph at 604. For example, the height and width of the photograph are multiplied respectively by the larger scaling factor. This scaled version is centered at the same center point as the photograph prior to scaling.

If needed, the photograph is translated to have the same center point as the mask at 606. In some cases, the mask and photograph do not have the same center point in some 2D space and the scaled photograph generated at 604 is translated or otherwise moved to have the center point of the mask. The corner points of the photograph are output at 608. For example, after scaling at 604 and translating at 606, the resulting corner points are output to a parent process.

In some embodiments, the smaller scaling factor is selected. For example, the smaller scaling factor may be used for operations such as fitting a frame to a photograph. In some cases, picking the larger scaling factor corresponds to cropping a photograph and picking the smaller scaling factor corresponds to showing more or all of a photograph.

In some cases, using the example processes of FIGS. 5 and 6 makes it appear as if a displayed portion of a photograph is being zoomed out when a user's change corresponds to approaching or nearing the aspect ratio of a photograph (e.g., 4:3). Conversely, it may appear as if a displayed portion is being zoomed in if a user's change corresponds to moving away from the aspect ratio of a photograph. The following figures illustrate an example where a change corresponds to moving away from the aspect ratio of a photograph and the new portion that is displayed as a result of a transformation appears to be zooming in. In some embodiments, the same or similar effect is achieved using some other process.

Figure 7A:
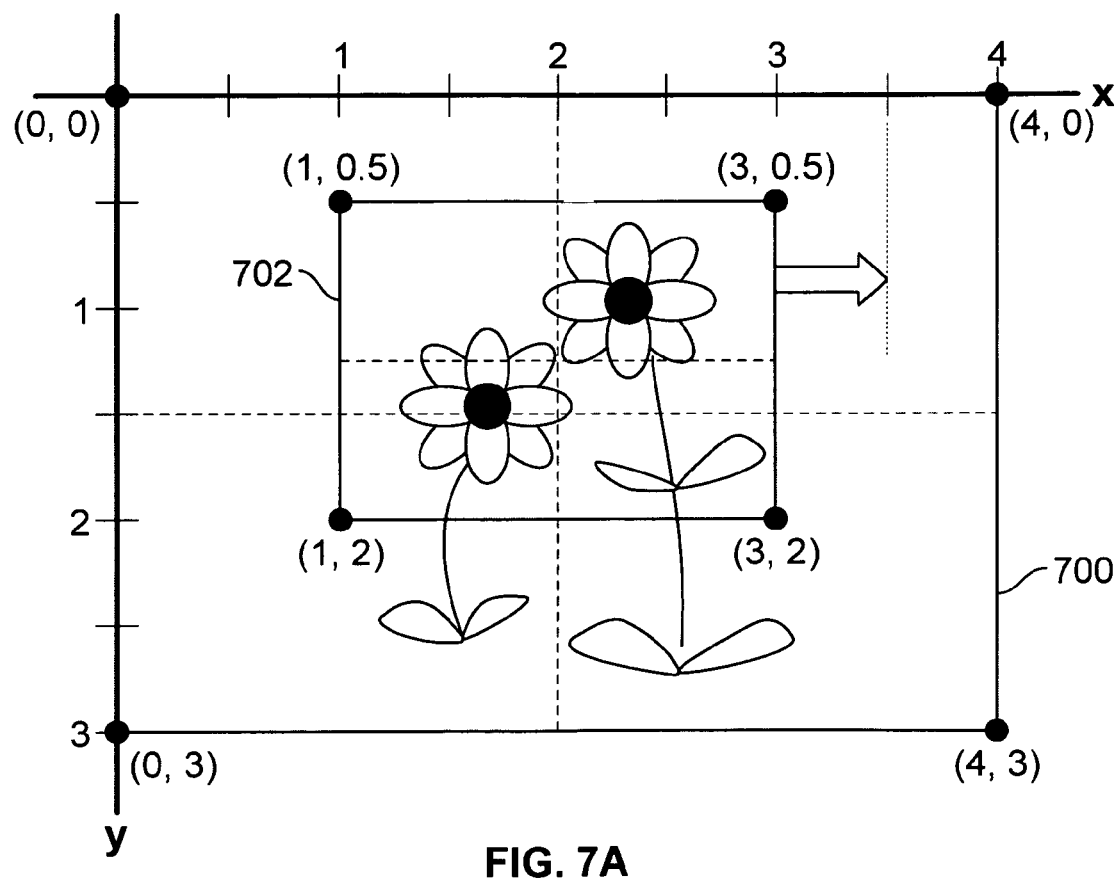
FIG. 7A is a diagram illustrating an embodiment of a photograph that is transformed based on a user's change to an associated mask.

FIG. 7A is a diagram illustrating an embodiment of a photograph that is transformed based on a user's change to an associated mask. In this example, the processes described in FIGS. 5 and 6 are used to determine a transformation to apply to photograph 700 based on the user's changes to mask 702. In this example, the same initial state (i.e., corner points of mask 702 and photograph 700) and user change (i.e., grabbing the right edge of mask 702 and dragging outward by half a unit) as in FIGS. 3A and 3B are shown. However, the transformation determined in the following figures includes resizing in addition to translating, whereas the examples of FIGS. 3A and 3B only performs a translation.

Figure 7B:
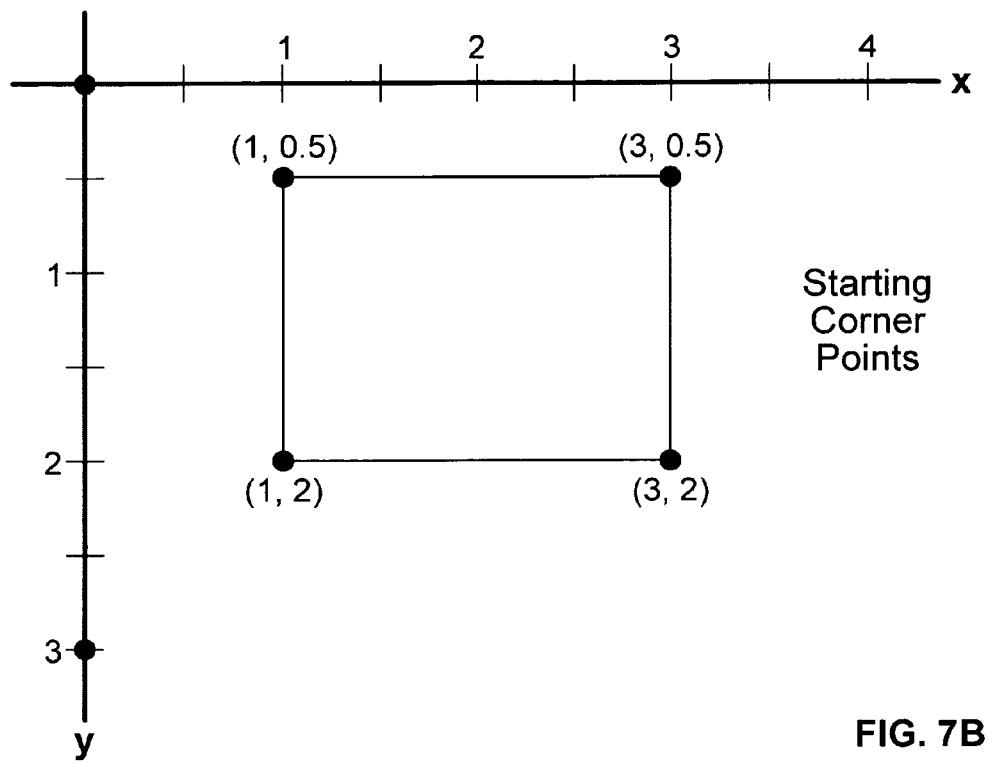
FIG. 7B is a diagram illustrating an embodiment of starting corner points.

FIG. 7B is a diagram illustrating an embodiment of starting corner points. In the example shown, step 500 is used to generate the starting corner points shown. The mask corner points prior to a user's change in this example are located at (1,0.5), (3,0.5), (1,2), and (3,2). In this particular case, mask 702 (prior to the user's change) already has the aspect ratio of photograph 700. Photograph 700 has an aspect ratio of (4−0):(3−0) which equals the aspect ratio of mask 702, (3−1):(2−0.5). Thus, the starting corner points are at the same locations as the mask corner points prior to the user's change: (1,0.5), (3,0.5), (1,2), and (3,2). In some embodiments, if the aspect ratio of a mask does not match that of a photograph, the example process of FIG. 6 is performed.

Figure 7C:
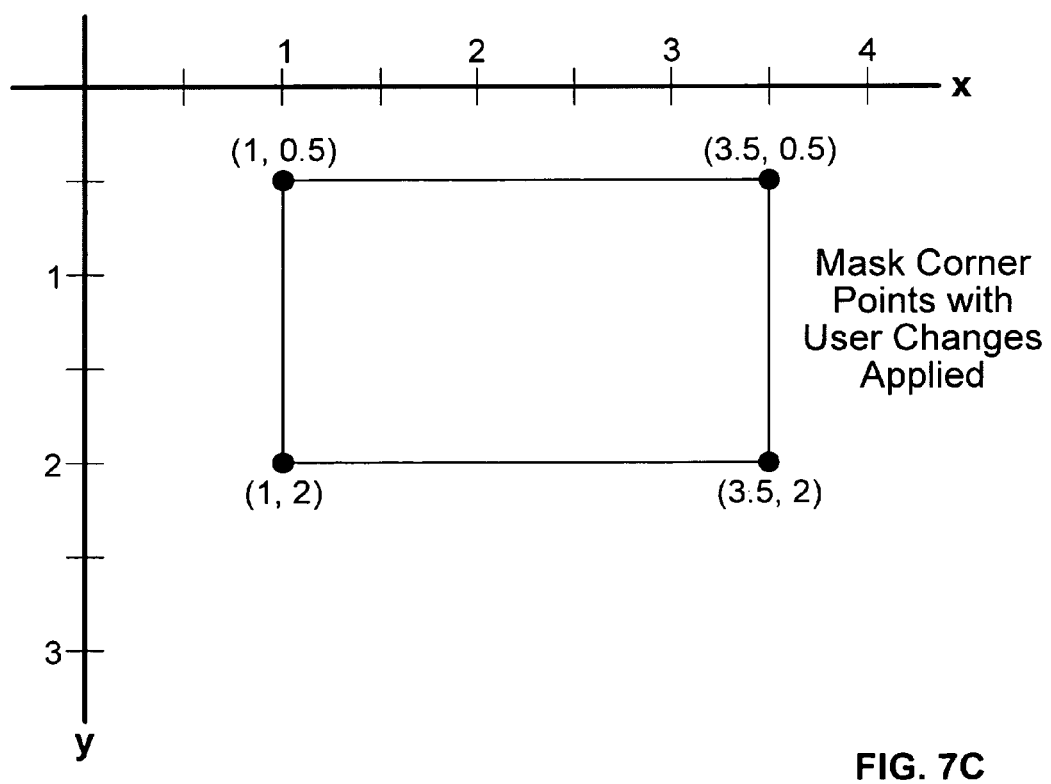
FIG. 7C is a diagram illustrating an embodiment of mask corner points with user changes applied.

FIG. 7C is a diagram illustrating an embodiment of mask corner points with user changes applied. In the example shown, step 502 is performed. The user grabbed the right corner of mask 702 and pulled it out by half a unit. The corner points go from (1,0.5), (3,0.5), (1,2), and (3,2) to (1,0.5), (3.5,0.5), (1,2), and (3.5,2).

Figures 7D, 7E:
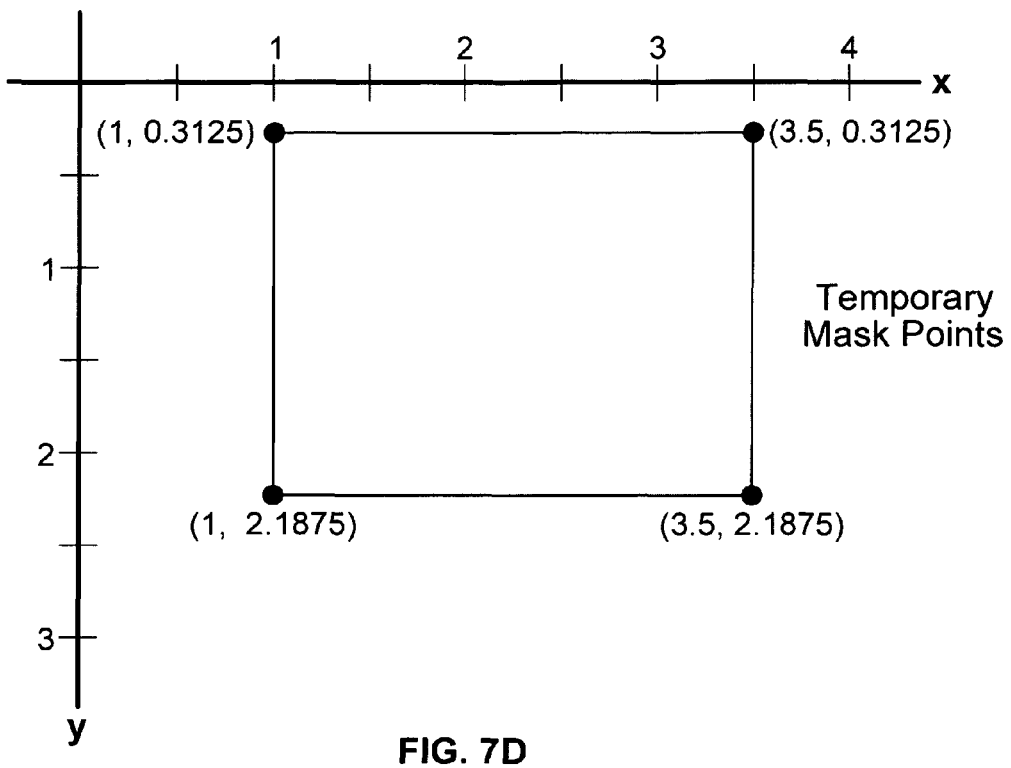
FIG. 7D is a diagram illustrating an embodiment of temporary mask points.
FIG. 7E is a diagram illustrating an embodiment of a transformation matrix.

FIG. 7D is a diagram illustrating an embodiment of temporary mask points. In the example shown, step 504 is used to generate the temporary mask points. FIG. 7C shows the mask corner points with the user changes applied and these corner points are used in generating temporary mask points. The aspect ratio of the mask with the user changes applied is (3.5−1):(2−0.5), which is not equal to the aspect ratio of the photograph (i.e., 4:3). In this example, the example process of FIG. 6 is used to modify the mask corner points with the user's changes applied so that they have the aspect ratio of the photograph (i.e., 4:3) without changing the center point.

The scaling factor associated with height is equal to (2−0.5):(3−0) or 1:2. The scaling factor associated with width is equal to (3.5−1):(4−0) or 5:8. Of the two, 5:8 is larger.

The larger scaling factor of 5:8 is then used to scale the photograph. The width of the scaled photograph is thus 0.625*(4−0) or 2.5 and the height of the scaled photograph is 0.625*(3−0) or 1.875. The scaled photograph is then translated so that it has the same center point as the mask (e.g., as in step 606). Referring to the example of FIG. 7C, the center point of the mask with the user changes applied is (2.25,1.25) and the scaled photograph is centered at this point. FIG. 7D shows the resulting corners of the temporary mask points. The set of points (1,0.3125), (3.5,0.3125), (1,2.1875), and (3.5, 2.1875) have an aspect ratio of 4:3 and are centered at (2.25, 1.25).

FIG. 7E is a diagram illustrating an embodiment of a transformation matrix. In this example, step 506 is performed and a transformation is determined. In this embodiment, the transformation is in the form of a matrix. In other embodiments, a transformation is in some other form, such as a polynomial or some other function. In the first equation shown, when the transformation matrix is applied to one corner point of the starting corner points (e.g., shown in FIG. 7B) a corresponding point of the temporary mask points (e.g., shown in FIG. 7D) is obtained. For example, if the upper left corner point of the starting corner points (i.e., located at (1,0.5)) is transformed, the upper left corner point of the temporary mask points (i.e., located at (1,0.3125) is obtained. The second equation shows the transformation matrix for which the first equation holds true for all corresponding corners.

Figure 7F:
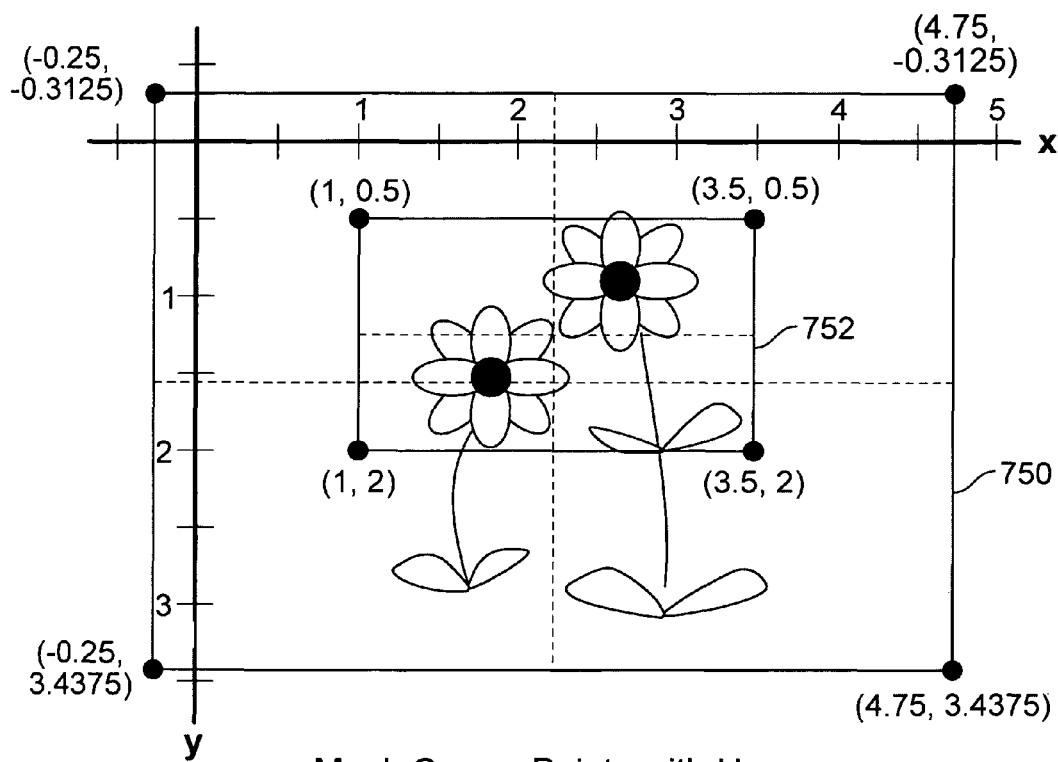
FIG. 7F is a diagram illustrating an embodiment of a mask with a user's changes applied and a photograph with a transformation applied.

FIG. 7F is a diagram illustrating an embodiment of a mask with a user's changes applied and a photograph with a transformation applied. In the example shown, the transformation matrix of FIG. 7E is applied to photograph 700 of FIG. 7A and transformed photograph 750 results. The corners of the transformed photograph are at (−0.25,−0.3125), (4.75,−0.3125), (−0.25,3.4375), and 4.75,3.4375). Mask 702 is the mask with a user's changes applied (e.g., shown in FIG. 7C) and has corners at (1,0.5), (3.5,0.5), (1,2), and (3.5,2).

The portion of transformed photograph 750 that is within mask 752 is the portion that is displayed in a related document, page, or template. The displayed portion shown in FIG. 7F is still centered or otherwise focused on the flowers even though a user selected the right edge of a drop zone and dragged it out. With other applications or interfaces, the displayed portion may no longer be so centered or focused on a particular region of a photograph. For example, some other applications may expose more background to the right of the flower heads (e.g., as a result of the user dragging a right edge out) and the user may be required to manually fix this when using some other applications. In certain cases this is time consuming. For example, the user may want to make many, small adjustments until she is satisfied with the positioning, size, and/or aspect ratio of images in a document and other applications may require her to manually repeat certain steps or correct undesired results. By transforming a photograph as a result of a user's changes (e.g., so that the center point of a displayed portion is maintained, a displayed portion appears to zoom in/out, etc.), in some cases these manual corrections and/or adjustments are avoided.

Compared to photograph 700, transformed photograph 750 is larger as a result of scaling applied by the transformation matrix. The example process is designed or otherwise configured to maintain the photograph's aspect ratio and as a result the transformed photograph has the same aspect ratio and the image does not appear distorted. Transformed photograph 750 has also been transposed. Note that the center point of transformed photograph 750 (shown with dotted lines in FIG. 7F) is now (2.25,1.5625) and is no longer (2,1.5) (shown with dotted lines in FIG. 7A).

In some embodiments, a drop zone is rotated. For example, a user making a scrapbook may want photographs laid out along diagonal line(s). In some embodiments, the example processes and techniques are modified as appropriate to accommodate any rotation. In some embodiments, a transformation that is determined based on a user's change attempts to preserve a rotation. In some embodiments, error checking is performed for certain corner cases or exceptions associated with rotation. For example, certain implementations may display blank spaces in some cases if a drop zone is rotated. If needed, additional error checking and/or correction are performed. In some embodiments, if a blank space is displayed, a translation is performed to remove the blank space.

Figure 8:
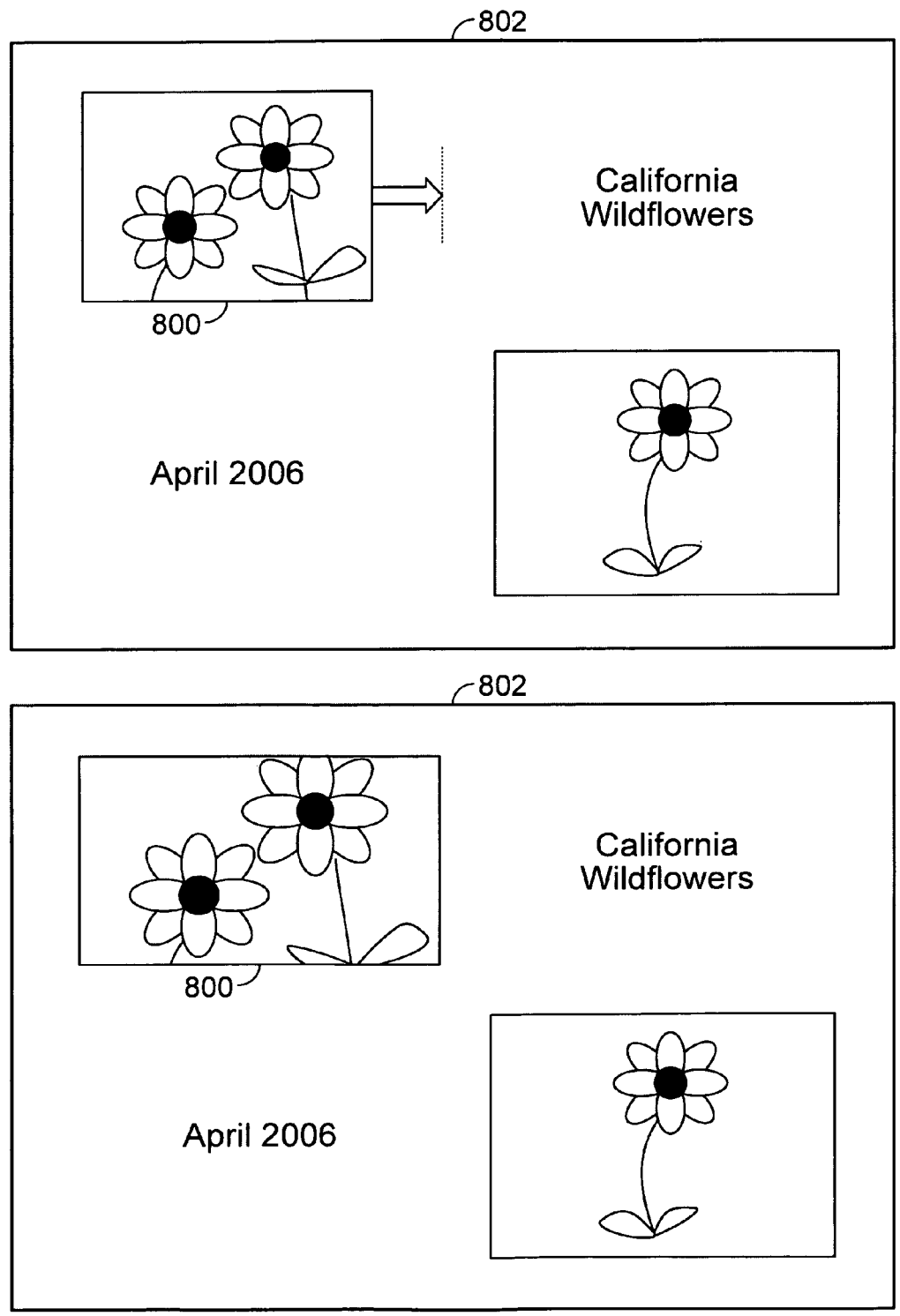
FIG. 8 is a diagram illustrating an embodiment of a document that includes a drop zone in which a user makes a change.

FIG. 8 is a diagram illustrating an embodiment of a document that includes a drop zone in which a user makes a change. In the example shown, the top diagram corresponds to FIG. 7A and the bottom diagram corresponds to FIG. 7F. In the top diagram, a user grabs the right edge of drop zone 800 within document 802 and drags it out half a unit. A transformation is determined and applied based on the user's change. The bottom diagram shows document 802 after the user's change and the transformation are applied. Note that the right edge of drop zone 800 in the bottom diagram has been extended out half a unit (e.g., as a result of the user's change) and that the displayed portion appears to have zoomed in and the center point of the displayed portion is substantially the same (e.g., as a result of the transformation).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   displaying a portion of a digital image, wherein the portion has a first center point resulting from a combination of (1) a placement of a mask within a document and (2) a placement of the digital image within the document;
   after displaying the portion of the digital image, using a processor to perform a first transformation on the mask;
   determining, based at least in part on the first transformation performed on the mask, a second transformation to be applied to the digital image such that the second transformation produces a second center point, resulting from a combination of (1) the placement within the document of the mask with the first transformation applied and (2) the placement within the document of the digital image with the second transformation applied, which is the same as the first center point;
   using the processor to perform the second transformation on the digital image; and
   displaying a new portion of the digital image, wherein the new portion results from the combination of (1) the placement within the document of the mask with the first transformation applied and (2) the placement within the document of the digital image with the second transformation applied.

2. A method as recited in claim 1, wherein the mask is rectangular.

3. A method as recited in claim 1, wherein displaying the new portion includes displaying the new portion of the digital image in an empty drop zone.

4. A method as recited in claim 3, wherein the drop zone has a background and/or a border.

5. A method as recited in claim 1, wherein performing the second transformation the second transformation includes applying a matrix.

6. A method as recited in claim 1, wherein the second transformation includes at least one of a translation or a resizing.

7. A method as recited in claim 1, wherein determining includes generating a set of corner points, including:
   calculating a scaling factor associated with width;
   calculating a scaling factor associated with height;
   selecting the larger of the scaling factors associated with height and width;
   applying the larger scaling factor to the digital image; and
   translating the scaled digital image, if needed, to have the same center point as the mask.

8. A method as recited in claim 1, wherein the new portion that is displayed does not have the same center point as the previously displayed portion in the event the same center point causes a blank space to be displayed.

9. A system, comprising:
   a processor; and
   a memory coupled with the processor, wherein the memory is configured to provide the processor with instructions which when executed cause the processor to:
      display a portion of a digital image, wherein the portion has a first center point resulting from a combination of (1) a placement of a mask within a document and (2) a placement of the digital image within the document;
      after displaying the portion of the digital image, performing a first transformation on the mask;
      determine, based at least in part on the first transformation performed on the mask, a second transformation to be applied to the digital image such that the second transformation produces a second center point, resulting from a combination of (1) the placement within the document of the mask with the first transformation applied and (2) the placement within the document of the digital image with the second transformation applied, which is the same as the first center point;
      perform the second transformation on the digital image; and
      display a new portion of the digital image, wherein the new portion results from
      the combination of (1) the placement within the document of the mask with the first transformation applied and (2) the placement within the document of the digital image with the second transformation applied.

10. A system as recited in claim 9, wherein the mask is rectangular.

11. A system as recited in claim 9, wherein displaying the new portion includes displaying the new portion of the digital image in an empty drop zone.

12. A system as recited in claim 11, wherein the drop zone has a background and/or a border.

13. A system as recited in claim 9, wherein the second transformation includes at least one of a translation or a resizing.

14. A system as recited in claim 9, wherein determining includes generating a set of corner points, including:
   calculating a scaling factor associated with width;
   calculating a scaling factor associated with height;
   selecting the larger of the scaling factors associated with height and width;
   applying the larger scaling factor to the digital image; and
   translating the scaled digital image, if needed, to have the same center point as the mask.

15. A system as recited in claim 9, wherein the new portion that is displayed does not have the same center point as the previously displayed portion in the event the same center point causes a blank space to be displayed.

16. A computer program product embodied in a non-transitory computer readable storage medium and comprising computer instructions for:
   displaying a portion of a digital image, wherein the portion has a first center point resulting from a combination of (1) a placement of a mask within a document and (2) a placement of the digital image within the document;

after displaying the portion of the digital image, performing a first transformation on the mask;

determining, based at least in part on the first transformation performed on the mask, a second transformation to be applied to the digital image such that the second transformation produces a second center point, resulting from a combination of (1) the placement within the document of the mask with the first transformation applied and (2) the placement within the document of the digital image with the second transformation applied, which is the same as the first center point;

performing the second transformation on the digital image; and displaying a new portion of the digital image, wherein the new portion results from the combination of (1) the placement within the document of the mask with the first transformation applied and (2) the placement within the document of the digital image with the second transformation applied.

17. A computer program product as recited in claim 16, wherein the mask is rectangular.

18. A computer program product as recited in claim 16, wherein displaying the new portion includes displaying the new portion of the digital image in an empty drop zone.

19. A computer program product as recited in claim 18, wherein the drop zone has a background and/or a border.

20. A computer program product as recited in claim 16, wherein the second transformation includes at least one of a translation or a resizing.

21. A computer program product as recited in claim 16, wherein determining includes generating a set of corner points, including:
   calculating a scaling factor associated with width;
   calculating a scaling factor associated with height;
   selecting the larger of the scaling factors associated with height and width;
   applying the larger scaling factor to the digital image; and
   translating the scaled digital image, if needed, to have the same center point as the mask.

22. A computer program product as recited in claim 16, wherein the new portion that is displayed does not have the same center point as the previously displayed portion in the event the same center point causes a blank space to be displayed.

* * * * *